Dec. 11, 1945.    N. L. HAIGHT    2,390,787
FOLLOW-UP MECHANISM
Filed Jan. 16, 1942
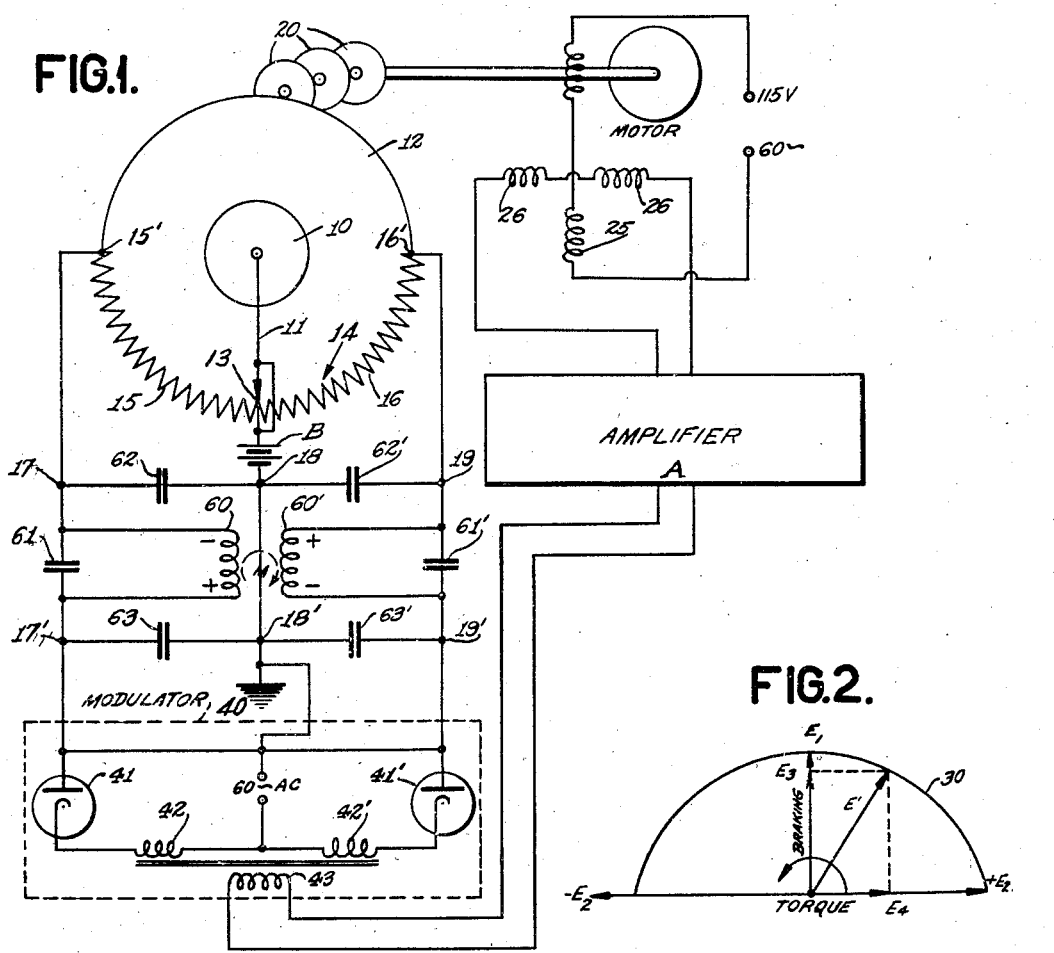
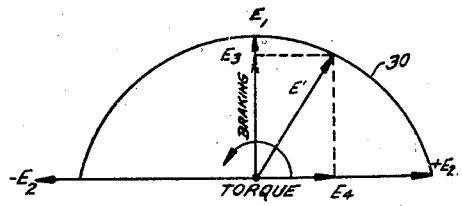
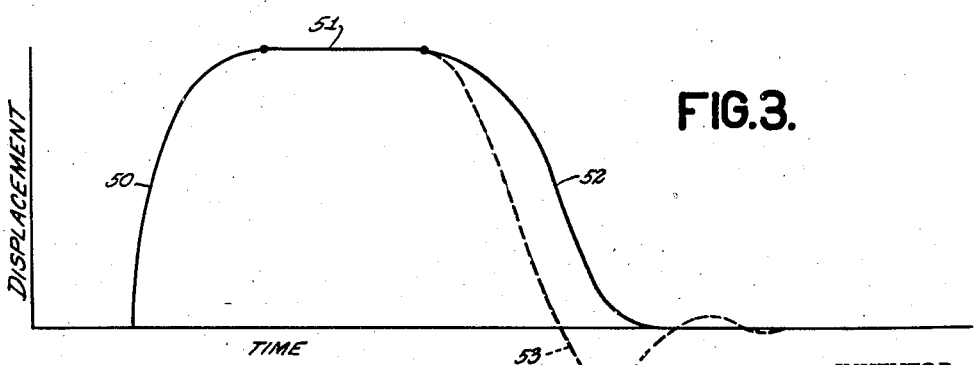
INVENTOR.
NORMAN L. HAIGHT
BY Joseph H. Lipschutz
ATTORNEY.

Patented Dec. 11, 1945

2,390,787

UNITED STATES PATENT OFFICE 2,390,787

FOLLOW-UP MECHANISM

Norman L. Haight, Glen Ridge, N. J., assignor to Sperry Products, Inc., Hoboken, N. J., a corporation of New York Application January 16, 1942, Serial No. 427,021

6 Claims. (Cl. 172—239)

This invention relates to electric follow-up systems wherein the displacement of a sensitive element with respect to a follow-up member sets in operation a follow-up mechanism designed to restore the initial relationship of the sensitive element and the follow-up member. Thus, for example, in a magnetic compass the compass needle holds its position on the magnetic meridian and if the ship moves there is a relative displacement between the ship and the compass needle. If a follow-up mechanism is set into motion to cause a follow-up member on the ship to be restored to its original position with respect to the needle, this angular movement between the member and the ship is a measure of the relative displacement of the ship with respect to the magnetic needle. The mechanism for operating the follow-up member to its original position through the angle of displacement may be caused to operate repeater elements such as repeater compasses whereby the angular displacement of the ship with respect to the compass can be transmitted to remote points.

One of the difficulties which has heretofore been encountered in connection with follow-up systems is that the motor which drives the follow-up element tends to cause the follow-up element to over-run, even though the impulse to the driving motor is theoretically zero when the follow-up member has returned to its original position with respect to the sensitive element. This is due to the inertia of the moving parts of the motor. The over-running causes a displacement between the follow-up member and the sensitive element in the opposite direction to the original displacement, energizing the motor in the opposite direction and thus setting up an oscillation or hunting movement of the follow-up member with respect to the sensitive element. A corresponding hunting movement is set up in the repeater units. It is therefore one of the principal objects of this invention to provide a follow-up mechanism in which such hunting or oscillation will be eliminated and substantially dead-beat restoring action by the follow-up motor of the follow-up element will be effected.

The foregoing principal object of this invention may be accomplished by taking into account not merely the relative displacement of the sensitive element with respect to the follow-up member, but also the rate of displacement between said element and said member. I am aware of the fact that various methods have been proposed for introducing a rate factor in the operation of follow-up mechanisms, but these have all involved considerable complication. It is one of the objects of my invention to introduce a rate factor which will involve the least amount of mechanism and the simplest arrangement. By this arrangement I am able to accomplish two desirable results. First, I introduce a factor in the motor operation which will cause it to slow down at an accelerated rate as the follow-up member nears its original position with respect to the sensitive element so that over-running is prevented. Secondly, by the same rate factor mechanism I am enabled to speed up the motor at an accelerated rate during the interval that the follow-up member is moving away from the sensitive element so that said motor will more quickly operate to return the member to its original position. Both the speeding up and the slowing down increments introduced by this novel rate factor are in addition to the increments of speeding up and slowing down of the motor dependent upon magnitude of displacement.

In order that the motor shall more effectively be brought to rest without over-running and hence causing hunting or oscillation, I may provide means for introducing into the motor a dynamic braking factor as the follow-up element approaches its original position with respect to the sensitive element and for removing such braking during the initial movement of the follow-up member away from the sensitive element so as to enable the motor quickly to restore the follow-up member toward its original position.

Further objects and advantages of this invention will become apparent in the following detailed description thereof.

In the accompanying drawing,

Fig. 1 is a wiring diagram of this invention.

Fig. 2 is a vector diagram illustrating the theory of the dynamic braking.

Fig. 3 is a graph illustrating the theory of this invention.

Referring to Fig. 1 of the drawing, I have shown my invention applied to a sensitive element indicated generally at 10 which may carry a contactor element 11 therewith and movable with respect to a follow-up member indicated generally at 12. The invention is not limited to use with any particular type of sensitive element but has general application wherever a follow-up mechanism is used. Thus the sensitive element 10 may be the magnetic element of a magnetic compass holding its position on the magnetic meridian, while the follow-up member 12 may be carried by a ship and will therefore turn with the ship to cause displacement between the sensitive element and the follow-up member whenever the ship turns from its course. When the ship is travelling on its course, contact member 11 may be in engagement with mid-point 13 of a potentiometer 14 carried by the follow-up member 12. A battery B is connected to the center point 13 and to the outer points 15' and 16' of the potentiometer to provide two circuits. The two branches 15 and 16 of the potentiometer have an equal number of turns and therefore the potential drops between point 13 and ends of the potentiometer contact arms, or between terminals 17 and 18 and 18 and 19 are equal. Since there is no relative displacement between contact arm 11 of the sensitive element and point 13 of the follow-up member 12, the follow-up motor M which is geared to the follow-up member 12 through suitable gearing 20 is not effective to drive the gearing because the motor is at rest. As soon, however, as there is relative movement between the sensitive element 10 and the follow-up member 12 there will be a difference in potential drop between terminals 17, 18 and 18, 19. This difference in potential drop is caused to energize motor M in one direction or the other, depending upon which potential drop 17, 18 or 18, 19 is greater. In any case, the connections are such that the motor M is driven in the direction to rotate follow-up member 12 so as to bring point 13 of the potentiometer again into coincidence with the contact arm 11 of sensitive element 10.

The control of motor M as outlined above is effected by reason of the fact that motor M has a plurality of windings, one of which, 25, is normally energized from a given circuit such as an ordinary 115 volt, 60 cycle circuit designed to yield a vector indicated in Fig. 2 as $E_1$. The motor is so designed that with an output from winding 25 of the phase $E_1$ there is no rotation of the motor armature but only braking action. To effect rotation of the motor it is necessary to introduce a vector having a component $E_2 \pm$ of a phase 90° removed from that of vector $E_1$ and the degree of rotation of the motor will depend upon the degree of the vector $E_2$, while the direction of rotation of the motor will depend upon the direction of vector $E_2$. Thus, if a vector of the order E' is introduced, the portion thereof in the direction of vector $E_2$ will determine the rate of rotation of the motor. It will also be observed that the braking factor $E_1$ has been reduced to the point indicated at $E_3$. Thus, while the torque factor increases to $E_4$, the braking factor diminishes. This result is desirable to obtain because in the initial movement of follow-up element 12 away from sensitive element 10 it is desirable that the maximum torque be introduced into motor M with the minimum braking. However, when the follow-up member 12 approaches its initial position with point 13 in engagement with contact arm 11, then the torque diminishes, and as the torque diminishes, the braking factor increases. It will thus be seen that by the arrangement of two windings 90° out of phase, there is obtained a vector which follows a substantially circular path indicated at 30, the net result of which is to give diminishing braking as torque increases, and, conversely, increasing braking as torque diminishes.

For obtaining the angular movement of the vector as shown in Fig. 2, I utilize a motor having a second winding 26 out of phase with motor winding 25 by 90° and cause the difference in potential drop between terminals 17, 18 and 18, 19 to determine the degree of the vector $E_2$ and its sign. For this purpose I may utilize a modulator indicated generally at 40 which may be energized from a source of 60 cycle alternating current and is provided with two parallel circuits each of which contains a non-linear device in the form of a vacuum tube 41, 41' and impedances which may take the form of induction coils 42, 42' in inductive relation to a secondary 43. The voltages from terminals 17, 18 and 18, 19 may be continued to terminals 17', 18' and 18', 19' leading into the modulator 40. The two non-linear devices 41, 41' in combination with impedances such as the transformer elements 42, 42' and 43 are arranged in such way as to produce a voltage whose phase relationship coincides with that of vector $E_1$ when the voltage drops between points 17', 18' and 18', 19' are equal. This is the case when contact arm 11 is in engagement with mid-point 13 of the potentiometer. The normal output from the modulator when the voltage drop across points 17', 18' equals the voltage drop across 18', 19', is applied to the winding 26 after being passed through an amplifier or other unilateral device A, and since the normal output results in a vector of the same phase as $E_1$, this assists the dynamic braking of the motor. However, when there is relative movement between the follow-up member and the sensitive element, and the voltage drop between 17', 18' differs from that between 18', 19', the modulator output is 90° out of phase with the normal output voltage due to the non-linear characteristics of the modulator which causes an unbalance of the input. Thus an output is obtained in the direction of vector $E_2$ and the result of combining the output $E_2$ from winding 26 with the output $E_1$ from winding 25 is a vector E' having a component $E_2$ which causes rotation of the motor and to a degree corresponding to the dimensions of the vector $E_4$. At the same time, the dynamic braking factor has been reduced by the difference between the vectors $E_1$ and $E_3$.

The operation of the motor control thus described is as follows: When there is relative movement between the follow-up member 12 and the sensitive element 10 causing a voltage drop between 17', 18' different from that between 18', 19', the modulator output on the winding 26 is 90° out of phase with the output of winding 25. This produces a vector E' which has a component $E_2$ which is the torque component which produces rotation of the motor in the proper direction to restore point 13 of the follow-up member to engagement with contact arm 11. The other component of vector E' is component $E_1$ which is the dynamic braking factor. The larger the $E_2$ component the smaller the dynamic braking factor $E_1$. This is desirable because when the displacement between the follow-up member and the sensitive element is large a large torque and small braking is required. However, when the point 13 of the follow-up member approaches contact arm 11, the torque factor $E_2$ diminishes and the dynamic braking factor increases until when point 13 engages contact arm 11 there is no output $E_2$ and the entire output of the modulator is in the direction of $E_1$ to give maximum braking.

In addition to the dynamic braking factor introduced by the modulator output which controls motor winding 26, a rate factor is introduced for further guarding against the possibility of overrunning of the motor and hence of the follow-up member 12. The action of the follow-up member in deviating from the sensitive member is illustrated in Fig. 3. In the initial movement indicated at 50 there is a rapid displacement in a short time before the motor M can become effective to restore the follow-up member at a sufficient rate to prevent further displacement. A second portion of the graph, 51, indicates the period when the motor M has caught up with the rate of displacement and keeps the angular displacement substantially constant. In the final period 52, the motor is effective to reduce the angular displacement and restore the follow-up member to its original position. The portion of the graph 53 illustrates the effect of over-running of the motor and consequent hunting movement of the follow-up member to either side of the sensitive element, heretofore experienced in follow-up devices. The dynamic braking of the motor described hereinbefore will assist in achieving curve 52 but may not of itself be completely effective to prevent such over-running. Therefore I have introduced a rate factor which will assist the motor in achieving the deadbeat action illustrated in graph portion 52. For this purpose the potentials between points 17, 18 and 18, 19 are parts of parallel circuits each of which includes an inductance 60, 60' arranged so that the current passing from terminal 17 to terminal 17' passes through inductance 60 by way of condenser 61 while the current from terminal 19 to terminal 19' passes through inductance 60' by way of condenser 61'. The inductances 60 and 60' are arranged in mutual inductive relation so that they act one upon the other, and are so wound that they are in opposition. Condensers 62, 62' and 63, 63' are introduced in these parallel circuits. The rate at which inductance can be fed from one side to the other is determined by the natural frequency of oscillation of the entire system (including the six condensers, potentiometer, modulator, amplifier, motor, etc.).

By reason of the mutual inductances 60 and 60' arranged in opposition, I am able to introduce into the motor M a rate factor which is beneficial in two directions, first, to increase the rate of operation of the motor in the initial stage of displacement so as to cause the follow-up member to return as quickly as possible, and then to decrease the rate of operation of the motor as the follow-up member nears its original position so as to prevent over-running of the motor. This increase and this decrease are of course in addition to the increase and decrease which results from the increase and reduction in displacement and consequently the increase and reduction in the $E_2$ vector applied to the winding 26. Thus, for example, in the initial stage of rapid displacement of the follow-up member from the sensitive element, first indicated by the portion 50 of the graph of Fig. 3, there will be an increase in voltage drop between 17, 18 and a decrease in voltage drop between 18, 19. Were it not for the mutual inductance between 60 and 60' this difference in potential drop would be exactly the same at 17', 18' and 18', 19' as at 17, 18 and 18, 19. However, by reason of the mutual inductance, the diminution in coil 60' and the increase in coil 60 results in a still further increase in current through coil 60 and a decrease in current through coil 60'. Thus, if normally when the system is in balance there is a 5 volt drop across 17, 18, there will be a 5 volt drop also across 18, 19. If, now displacement causes a 6 volt drop across 17, 18, there will be a 4 volt drop across 18, 19. However, by reason of the mutual inductance between 60 and 60' this difference may be increased to 7 volt drop between 17', 18' and 3 volt drop between 18', 19', as an example. Thus the mutual inductance is effective to increase the $E_2$ factor which is applied to the motor in the initial stage 50 of the Fig. 3 graph. This is desirable in that it causes a quick return of the follow-up member toward its original position. Having once caught up with the rate of displacement and, in fact, started to return the follow-up member, the motor has reached the portion 52 of the graph of Fig. 3 and thus there is a decreasing rate of displacement between the follow-up member and the sensitive element. Thus, if 4 volts represents the drop between 18, 19 and 6 volts the drop between 17, 18, by reason of the mutual inductance between 60 and 60' the decreasing rate of change may increase the voltage across 18, 19 to 4½ while decreasing the drop across 17, 18 to 5½. Thus the decrease in voltage difference between 17, 18 and 18, 19 is accelerated by the mutual inductance with the result that the $E_2$ factor is diminished faster than would otherwise be the case and the motor M is brought to rest more quickly than would otherwise be the case as the point 13 of follow-up member 12 approaches contact arm 11.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a follow-up mechanism, a sensitive element, a follow-up member, an electric motor for actuating said member, said motor having an armature and a plurality of windings, a source of energy for normally energizing one of said windings so as to retard the armature, energization of the other of said windings in predetermined phase relationship with said first winding serving to increase the retarding effect while energization of said second winding in different phase relationship with said first winding decreases the retarding effect on said armature and increases the torque thereof to the degree of said change in phase relationship and in a direction depending on the direction of said change in phase relationship, means whereby said second winding is normally energized in said predetermined phase relationship with said first winding when there is no relative displacement between said sensitive element and said member, and means whereby relative displacement between said element and said member changes the predetermined phase relationship of said second winding in a direction to cause said motor to reduce said relative displacement.

2. In a follow-up mechanism, a sensitive element, a follow-up member, an electric motor for actuating said member, said motor having an armature and a plurality of windings, a source of energy for normally energizing one of said windings so as to retard the armature, energization of the other of said windings in phase with said first winding serving to increase the retarding effect while energization of said second winding out of phase with said first winding decreases the retarding effect on said armature and increases the torque thereof to the degree of said out-of-phase relationship and in a direction depending on the direction of said phase displacement, means whereby said second winding is normally energized in phase with said first winding when there is no relative displacement between said sensitive element and said member, and means whereby relative displacement between said element and said member displaces the phase of said second winding in a direction to cause said motor to reduce said relative displacement.

3. In a follow-up mechanism, a sensitive element, a follow-up member, an electric motor adapted to be energized when said element and said member are relatively displaced, so as to restore said element and said member to undisplaced relationship, said motor having an armature and a plurality of windings, means for preventing over-running of said motor, said last-named means comprising a source of energy for normally energizing one of said windings so as to retard the armature, energization of the other of said windings in predetermined phase relationship with said first winding serving to increase the retarding effect while energization of said second winding in different phase relationship with said winding decreases the retarding effect on said armature and increases the torque thereof to the degree of said change in phase relationship and in a direction depending on the direction of said change in phase relationship, means whereby said second winding is normally energized in said predetermined phase relationship with said first winding when there is no relative displacement between said sensitive element and said member, means whereby relative displacement between said element and said member generates a D. C. potential, means whereby said D. C. potential changes the predetermined phase relationship of said second winding in a direction to cause said motor to reduce said relative displacement, said last-named means including mutual inductance means adapted to be rendered effective by the rate of change of said D. C. potential and so linked as to increase an increasing rate and decrease a decreasing rate of change of said potential.

4. In a follow-up mechanism, a sensitive element, a follow-up member, an electric motor adapted to be energized when said element and said member are relatively displaced, so as to restore said element and said member to undisplaced relationship, said motor having an armature and a plurality of windings, means for preventing over-running of said motor, said last-named means comprising a source of energy for normally energizing one of said windings so as to retard the armature, energization of the other of said windings in phase with said first winding serving to increase the retarding effect while energization of said second winding out of phase with said first winding decreases the retarding effect on said armature and increases the torque thereof to the degree of said out-of-phase relationship and in a direction depending on the direction of said phase displacement, means whereby said second winding is normally energized in phase with said first winding when there is no relative displacement between said sensitive element and said member, means whereby relative displacement between said element and said member generates a D. C. potential, means whereby said D. C. potential displaces the phase of said second winding in a direction to cause said motor to reduce said relative displacement, said last named means including mutual inductance means adapted to be rendered effective by the rate of change of said D. C. potential and so linked as to increase an increasing rate and decrease a decreasing rate of change of said potential.

5. In a follow-up mechanism, a sensitive element, a follow-up member, an electric motor for actuating said member, means whereby relative displacement between said element and said member generates a D. C. potential, means whereby said potential actuates said motor, said last named means including a pair of circuits normally balanced relative to each other, each circuit including an inductance, said inductances being arranged in mutually inductive relation.

6. In a follow-up mechanism, a sensitive element, a follow-up member, an electric motor for actuating said member, means whereby relative displacement between said element and said member generates a D. C. potential, means whereby said potential actuates said motor, said last named means including a pair of circuits normally balanced relative to each other, each circuit including an inductance, said inductances being arranged in mutually inductive relation and linked in opposition so as to increase an increasing rate and decrease a decreasing rate of change of potential.

NORMAN L. HAIGHT.